(12) United States Patent
Pan et al.

(10) Patent No.: US 8,543,728 B2
(45) Date of Patent: Sep. 24, 2013

(54) DAMPENING INTERFACE FLAPPING

(75) Inventors: Zhongping Pan, Plano, TX (US);
Shengping Shiau, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 727 days.

(21) Appl. No.: 12/731,556

(22) Filed: Mar. 25, 2010

(65) Prior Publication Data
US 2011/0238843 A1     Sep. 29, 2011

(51) Int. Cl.
*G06F 15/173* (2006.01)
(52) U.S. Cl.
USPC ........... 709/238; 709/227; 709/242; 370/221; 370/225; 370/241; 370/242
(58) Field of Classification Search
USPC .......................................................... 709/227
See application file for complete search history.

(56) References Cited

U.S. PATENT DOCUMENTS

| 7,864,706 | B1 * | 1/2011 | Zinjuwadia et al. | 370/254 |
|---|---|---|---|---|
| 2007/0019676 | A1 * | 1/2007 | Kompella | 370/468 |
| 2009/0046579 | A1 * | 2/2009 | Lu et al. | 370/225 |
| 2010/0049868 | A1 * | 2/2010 | Ginsberg et al. | 709/242 |
| 2010/0080115 | A1 * | 4/2010 | Yang et al. | 370/216 |

* cited by examiner

*Primary Examiner* — Firmin Backer
*Assistant Examiner* — Natisha Cox (57) ABSTRACT

A device may include a control module and a line card. The control module may be configured to run a routing protocol to obtain routing information from network devices. The line card may include a processor. The processor may be configured to establish a bidirectional forwarding detection (BFD) session with a remote device, determine whether an interface associated with the BFD session is flapping, terminate the BFD session when the interface is flapping, disable the interface when the interface is flapping, re-enable the interface after a dampening recovery period elapses, reestablish the BFD session, and send a BFD packet to the remote device.

19 Claims, 8 Drawing Sheets

DAMPENING INTERFACE FLAPPING

BACKGROUND INFORMATION

A network interface on a router can "flap," alternately failing (e.g., becoming unavailable) and recovering (e.g., becoming available). Such a network interface, in turn, can lead to route flapping, the condition in which routers in a network continually and alternately advertise different routes to a destination. The routers may THEN constantly allocate computational resources to modify logical network topology, degrading the quality-of-service (QoS) provided by the network.

DETAILED DESCRIPTION OF PREFERRED EMBODIMENTS

The following detailed description refers to the accompanying drawings. The same reference numbers in different drawings may identify the same or similar elements.

As used herein, the term "router" may refer to a network level 2 or level 3 (e.g., an Internet Protocol (IP) level) router or switch (e.g., a multi-protocol label switching (MPLS) router/switch) or any other device used to route data from a source to a destination. As used herein, the term "flapping" may refer to cycling through two or more states. For example, a network interface can "flap," cycling through, alternately, a failed state (e.g., unavailable) and an operational state (e.g., available). In another example, a route flapping may occur when a route becoming alternately available and unavailable.

Figure 1:
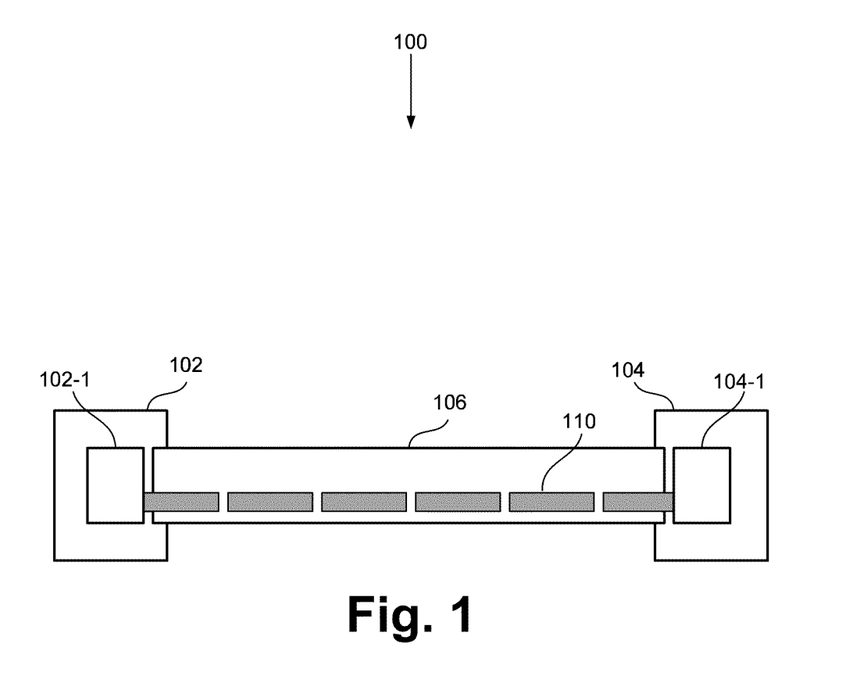
FIG. 1 illustrates exemplary concepts described herein.

In the following, a network device may detect interface flapping and provide for dampen the flapping via a modified bidirectional forwarding detection (MBFD) protocol. FIG. 1 illustrates concepts described herein. As shown, system 100 may include a network device 102, network device 104, and a communication link 106. Network devices 102 and 104 may include network interfaces 102-1 and 104-1, via which network devices 102 and 104 may communicate with one another over communication link 106. Network interfaces 102-1 and 104-1 may be logical or physical interfaces.

To detect interface flapping, network devices 102 and 104 may establish a MBFD session and exchange MBFD control packets 110 over communication link 106. Based on received MBFD packets, network device 102 (or device 104) may determine whether network interface 102-1 (or 104-1) is flapping. If so, network device 102 may disable network interface 102-1. Network device 102 may wait for a period of time sufficient to dampen the flapping, and subsequently re-enable the network interface 102-1.

The above approach may avoid or overcome issues that may arise in typical implementations to dampen interface flapping. For example, in some implementations, a router may be configured, by a network operator, to identify and dampen flapping of physical network interfaces. Such implementations may be unable to handle flapping of a logical interface. In other implementations, the BFD protocol running on a network interface of a router may be associated with the Border Gateway Protocol (BGP) or Open Shortest Path First (OSPF) routing protocol running on a control plane. When the BFD protocol detects a failure in the forwarding path, the router may disable the BGP/OSPF protocol to reduce consumption of system/network resources. However, in such implementations, the network interface (e.g., a logical, layer 2 logical interface, layer 3 interface, etc.) may be left running, and therefore, cause problems with respect to network operation and management.

Figure 2:
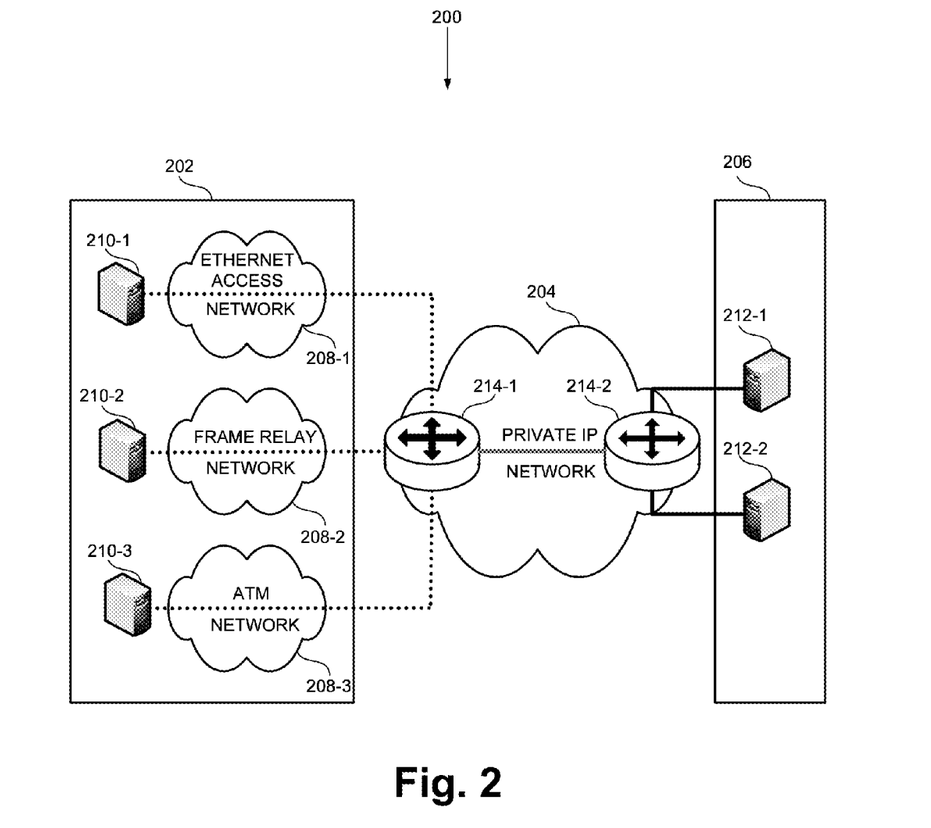
FIG. 2 illustrates an exemplary network in which concepts described herein may be implemented.

FIG. 2 illustrates an exemplary network in which concepts described herein may be implemented. As shown, network 200 may include indirect access network 202, private Internet Protocol (IP) network 204, and direct access network 206. Depending on the implementation, network 200 may include fewer, additional, or different types of network, such as the Internet, an intranet, a local area network (LAN), a wide area network (WAN), a metropolitan area network (MAN), a cellular network, a public switched telephone network (PSTN), an ad hoc network, any other network, or a combination of one or more networks.

Indirect access network 202 may include Ethernet access network 208-1, frame relay network 208-2, and Asynchronous Transfer Mode (ATM) network 208-3, and customer edge (CE) routers 210-1, 210-2, and 210-3. Ethernet access network 208-1, frame relay network 208-2, and ATM network 208-3 may provide, respectively, Ethernet, frame relay, and ATM routing at network layer 2. CE routers 210-1, 210-2, and 210-3 may send or receive packets from private IP network 204 via Ethernet access network 208-1, frame relay network 208-2, and ATM network 208-3.

Private IP network 204 may provide layer 3 virtual private networks (VPNs) to customers. Depending on states of its network elements (e.g., whether a network interface at a router is flapping), operating conditions of private IP network 204 may vary (e.g., decreased bandwidth, instability in network topology, etc.).

Private IP network 204 may include different network elements, such as provider edge (PE) routers 214-1 and 214-2, hereafter collectively or individually referred to as "PE routers 214" or "PE router 214-$x$," respectively (e.g., a multiprotocol label switching (MPLS) router). PE router 214-$x$ may include logic that implements the MBFD protocol for handling interface flapping.

Direct access network 206 may include CE routers 212-1 and 212-2, which are attached to PE router 214-2 of private IP network 204. Direct access network 206 may include additional network elements, which are not shown in FIG. 2 for the purposes of simplicity and ease of understanding.

Figure 3:
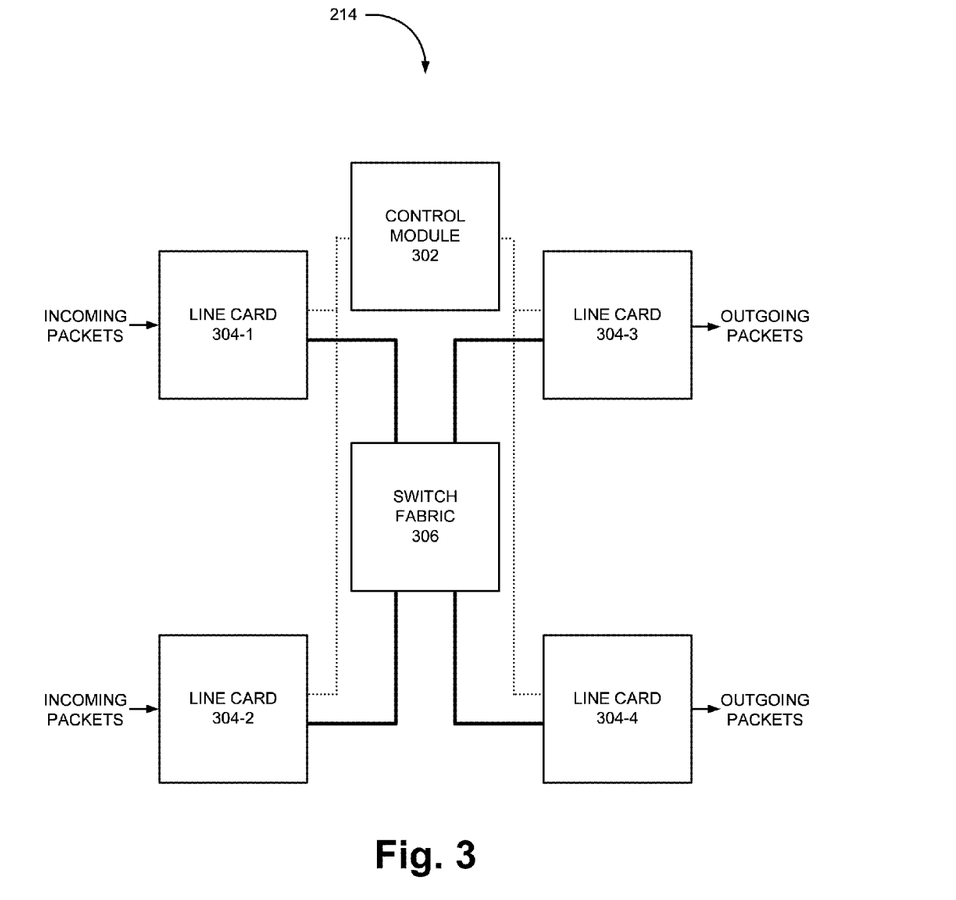
FIG. 3 shows exemplary components of an exemplary router of FIG. 2.

FIG. 3 illustrates router 214-$x$ according to an exemplary implementation. As shown in FIG. 3, router 214-$x$ may include a control module 302, line cards 304-1 through 304-4 (collectively "line cards 304" and generically "line card 304-$x$") and a switch fabric 306.

Control module 302 may include components for managing routes, flow statistics, and/or other types of information that may require centralized processing. For example, control module 302 may gather or disseminate routing information from/to other routers 214 in accordance with routing/signaling protocols, organize the routing information in a routing table, etc. In some implementations, control module 302 may enable/disable or activate/deactivate a particular routing protocol in response to signaling from other components of router 214-x (e.g., line card 304-x).

Line card 304-x may include components for receiving packets from devices or components in network 200, forwarding the packets to other devices in network 200, classifying packets, etc. In addition, line card 304-x may implement MBFD logic for detecting interface flapping and dampening the flapping. In some implementations, line card 304-x may signal control module 302 to enable/activate or disable/deactivate a particular routing protocol (e.g., OSPF, BGP, etc.).

Switch fabric 306 may include switches for conveying packets from line cards 304 or other modules (not shown) to other line cards 304 or other modules.

Router 214-x may include fewer, additional and/or different components than those shown in FIG. 3. For example, router 214-x may include additional or fewer line cards or additional control modules. In another example, router 214-x may include components for performing deep packet inspection (DPI).

Figure 4:
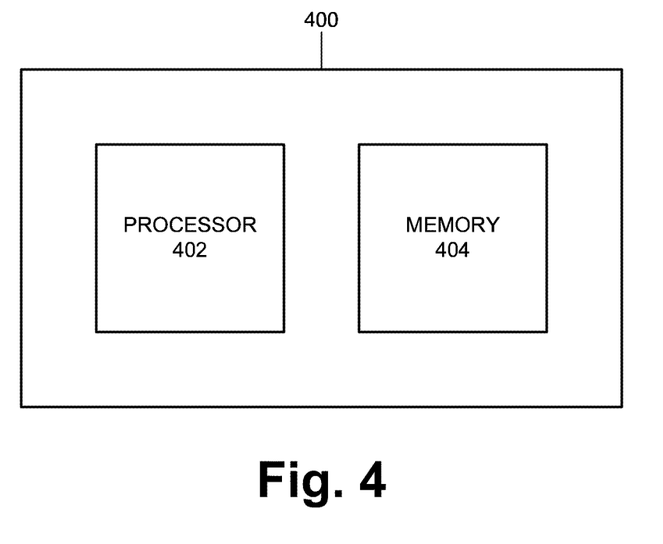
FIG. 4 is a block diagram illustrating exemplary components of the control module or a line card of FIG. 3.

FIG. 4 is a block diagram illustrating exemplary components of control module 302 or line card 304-x. As shown, control module 302/line card 304-x may include a processor 402 and a memory 404. Depending on the implementation, control module 302 may include additional, fewer, and/or different components than those illustrated in FIG. 4.

Processor 402 may include one or more processors, microprocessors, ASICs, and/or Field Programmable Gate Arrays (FPGAs), and/or other processing logic. In some implementations, processor 402 may include processors dedicated to specific functions, such as memory management, packet inspection, etc. Memory 404 may include static memory, such as read only memory (ROM), and/or dynamic memory, such as random access memory (e.g., dynamic RAM (DRAM), synchronous DRAM, static RAM (SRAM), etc.), or onboard cache, for storing data and machine-readable instructions. In some instances, memory 404 may also include storage media, such as a magnetic and/or optical storage/recording medium. In some implementations, a portion of memory 404 may be mounted under a directory or mapped to a drive.

Figure 5A:
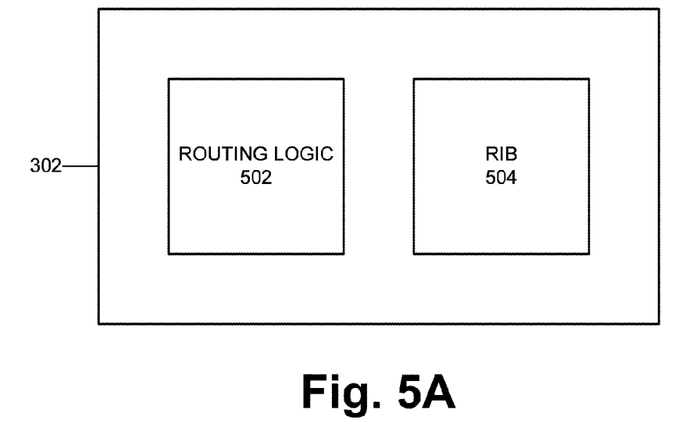
FIG. 5A is a block diagram illustrating exemplary functional components of the control module of FIG. 3.

FIG. 5A is a block diagram illustrating exemplary functional components of control module 302. As shown, control module 302 may include routing logic 502 and routing information base 504. Depending on the implementation, control module 302 may include additional, fewer, or different components (e.g., an operating system).

Routing logic 502 may include hardware and/or software components for communicating with other routers to gather and store routing information in a routing information base (RIB) (e.g., RIB 504) or label information base (LIB), in accordance with one or more routing protocols. Furthermore, routing logic 502 may obtain, based on a RIB or LIB, for each destination address/label of packets to be forwarded by router 214-x, a line card identifier, next hop information, etc. The information may be distributed to line cards 304.

In addition, routing logic 502 may respond to signals from line cards 304 when one or more line cards 304 indicate that an interface is flapping or the interface has recovered, and may either enable/activate or disable/deactivate routing protocols.

RIB 504 may include descriptions of paths and metrics under different routing protocols. RIB 504 may receive information from routing logic 502 and store the received information.

Figure 5B:
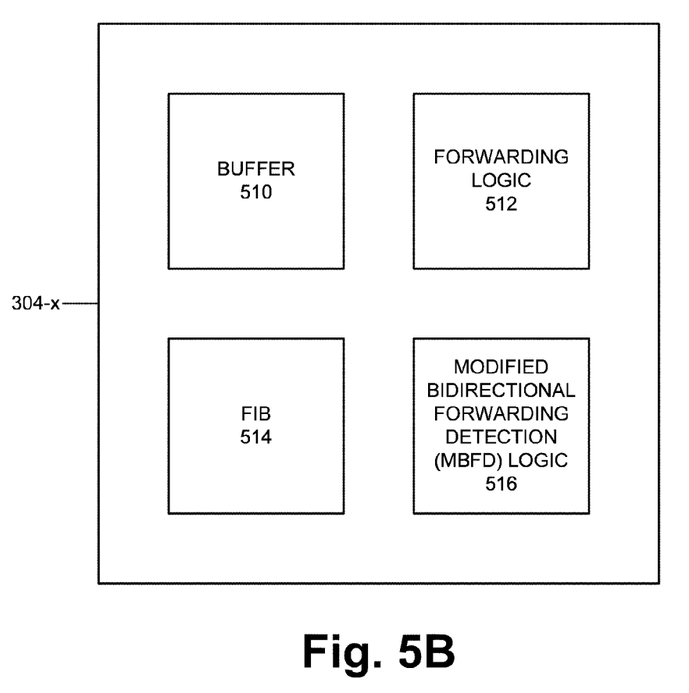
FIG. 5B is a block diagram illustrating exemplary functional components of a line card of FIG. 3.

FIG. 5B is a block diagram illustrating exemplary functional components of line card 304-x. As shown line card 304-x may include buffer 510, forwarding logic 512, forwarding information based (FIB) 514, and modified bidirectional forwarding detection (MBFD) logic 516. Depending on the implementation, line card 304-x may include additional, fewer, or different components than those illustrated in FIG. 5B. For example, in one implementation, MBFD logic 516 may be integrated into forwarding logic 512. In another example, line card 304-x may include additional components for processing packets.

Buffer 510 may store incoming packets. If packets arrive in a burst, the packets may be stored in buffer 510 of memory 404 until higher priority packets are processed and/or transmitted to an egress line card 304-x via switch fabric 306.

Forwarding logic 512 may include hardware and/or software for forwarding a packet that is received at line interface 304-x. Forwarding logic 512 may perform a lookup in FIB 514, and may obtain a packet descriptor that includes a forwarding address (e.g., a destination switch fabric port, a destination network port, etc.). In addition, forwarding logic 512 may forward the packet to an egress line card 304-x.

FIB 514 may include a lookup table used for forwarding packets. Given a packet's destination address in the packet header, forwarding logic 512 may lookup, in FIB 514, a routing entry whose address prefix provides the longest match to the destination address of the packet. When the routing entry is found in FIB 514, forwarding logic 512 may forward the packet in buffer 510 to an egress line card 304-x via switch fabric 306. Subsequently, the egress line card 304-x may transmit the packet toward its destination.

MBFD logic 516 may establish/create a MBFD session with a network device, exchange MBFD packets with the network device during the session, tear down the MBFD session, detect a faulty network interface or channel, signal control module 302 to enable/disable upper layer routing protocols, and enable/disable a network interface (e.g., logical or physical network interface (e.g., a logical ATM interface, a logical Ethernet interface, frame relay interface, etc.)).

MBFD logic 516 may operate in accordance with the BFD protocol. For example, MBFD logic 516 may operate, as does the BFD protocol, in Asynchronous mode or in demand mode (e.g., a state in which one device can "demand" a response to receive a BFD packet). Furthermore, MBFD logic 516 may provide, as does the BFD protocol, echo responses.

Figure 6A:
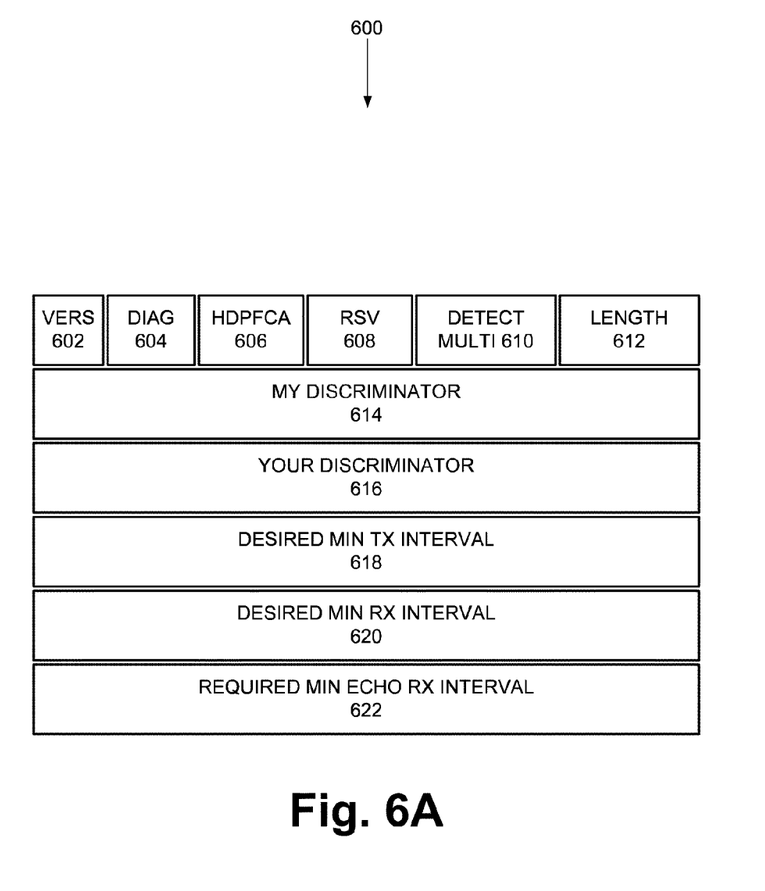
FIG. 6A is a block diagram illustrating an exemplary modified bidirectional forwarding detection (MBFD) control packet according to one implementation.

FIG. 6A is a block diagram illustrating an exemplary MBFD control packet 600 according to one implementation. As shown, MBFD control packet 600 may include a version field 602, diagnostic field 604, HDPFCA bit fields 606, reserved Field 608, detection time multiplier field 610, length field 612, my discriminator field 614, your discriminator field 616, desired minimum transmit interval field 618, desired minimum receive interval field 620, and required minimum echo receive interval field 622. Depending on the implementation and/or operating condition, MBFD control packet 600 may include additional fields, such as authentication fields, a dampening recovery threshold field, etc.

Version field 602 may indicate the version of BFD protocol (e.g., version 0) implemented by a component transmitting the MBFD control packet 600. Diagnostic field 604 may indicate a local system (e.g., router 214-x)'s reason for the last change in state of the MBFD/BFD session. For example, diagnostic field 604 may show the code "2" for failure in echo, the code "1" for the expiration of detection time, etc. HDPFCA bit fields 606 may include a sequence of bits labeled "H," "D," "P", "F," "C," and "A", to indicate the following: whether router 214-x is not receiving BFD/MBFD packets from a remote system or is in the process of tearing down the BFD/MBFD session; whether router 214-x wishes to operate in the demand mode; whether router 214-x is requesting a verification of connectivity or parameter change; whether the transmitting system is responding to a received BFD/MBFD control packet with a specific bit set to 1; whether the BFD/MBFD logic 516 in router 214-x is implemented in a control plane; and/or whether authentication fields are present in BFD/MBFD control packet 600.

Reserved field 608 may include a "dampening bit." The dampening bit may indicate whether network interface at either end of a communication link may be flapping. If the dampening bit is set, a dampening recovery threshold field, which may be N (e.g., 4) bytes long and appended to the end of MBFD control packet 600, may indicate, to a remote device, a dampening recovery threshold. The dampening recovery threshold may specify the amount of time for which MBFD logic 516 in router 214-x may keep a network interface offline. By having the network interface offline for at least the duration of the dampening recovery threshold, MBFD logic 516 may prevent the network interface from flapping.

Detection time multiplier field 610 indicate a value by which a transmit interval (described below) may be multiplied to determine an epoch in which a failure in a communication link (e.g., a communication link between 210-1 and 214-1) may be detected. Length field 612 may indicate the length of MBFD control packet 600.

My discriminator field 614 may include a number used by router 214-x (e.g., device receiving/exchanging MBFD control packet 600) to demultiplex multiple BFD/MBFD sessions. Your discriminator field 616 may reflect a value in my discriminator field 614 of a received MBFD control packet 600. When router 214-x generates a response MBFD control packet 600, router 214-x may insert, in your discriminator field 616 of the response MBFD control packet 600, the value of my discriminator field 614 of the received MBFD control packet 600.

Desired minimum transmit interval field 618 may indicate the minimum time, in microseconds, that router 214-x may use in generating and/or transmitting MBFD control packet 600. Desired minimum receive interval field 620 may include the minimum time interval (e.g., in microseconds) in which MBFD logic 516 may receive no more than one MBFD control packet 600. Required minimum echo receive interval field 622 may indicate (e.g., in microseconds) the minimum time between received MBFD echo packets that router 214-x may support.

Figure 6B:
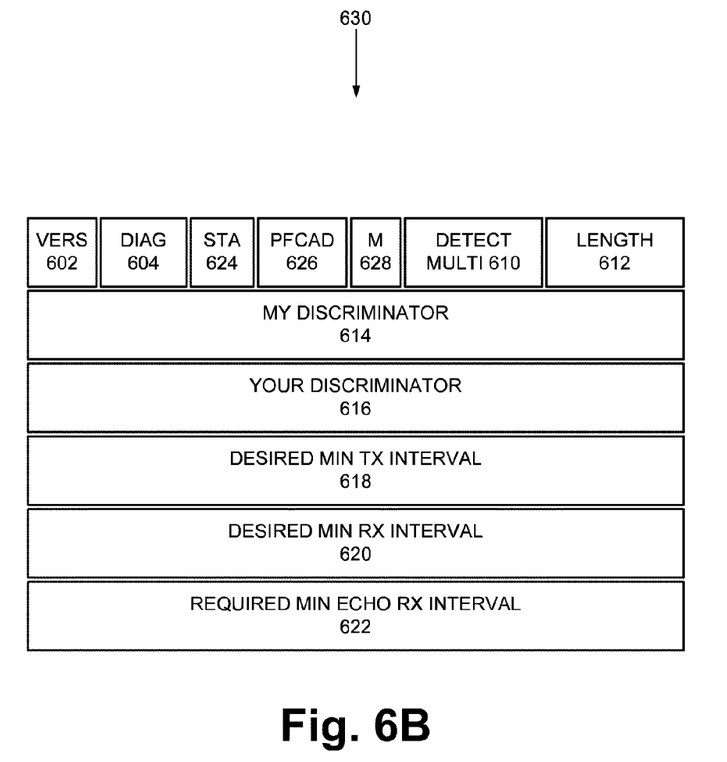
FIG. 6B is a block diagram illustrating an exemplary MBFD control packet according to another implementation.

FIG. 6B is a block diagram illustrating an exemplary MBFD control packet 630 according to another implementation. As shown, MBFD control packet 630 may include similar fields as MBFD control packet 600. However, in place of HDPFCA bit fields 606 and reserved field 608 in MBFD control packet 600, MBFD control packet 630 may include STA field 624, PFCAD fields 626, and multipoint field 628.

STA fields 624 may indicate a current state of MBFD session (e.g., down state, up state, etc.). PFCAD fields 626 may include similar information as HDPFCA bit fields 606, except that D bit in PFCAD fields 626 occurs at the end, and PFCAD fields 626 does not include the H bit field.

Multipoint field 628 may include a dampening bit, similarly as reserved field 608 in MBFD control packet 600.

By setting the dampening bit, router 214-x may indicate, to a remote device in a MBFD session with router 214-x, that a network interface at router 214-x may be flapping, provided MBFD control packet 600/630 is successfully sent to the remote device. Furthermore, when MBFD logic 516 sends MBFD control packet 600/630, to the remote device, with the dampening bit set, MBFD logic 516 may append a dampening recovery threshold field (e.g., 4 bytes long to MBFD control packet 600/630). The dampening recovery threshold field may indicate the amount of time for which MBFD logic 516 at router 214 may keep the flapping network interface offline.

When only one of two end point devices/routers sets the dampening bit over a point-to-point link, the router/network device setting the dampening bit can dictate the dampening recovery threshold. However, if both of the routers/network devices set the dampening bits on MBFD control packets that they exchange, the routers/network devices may need to negotiate a dampening recovery threshold value. For example, both routers/network devices may set the dampening recovery threshold to be the shorter of two values that are initially advertised by the routers/network devices in the MBFD session. Setting the dampening recovery threshold for the routers/devices may be useful should both of the routers/devices run the dampening feature at the same time. Setting the same dampening recovery threshold may ensure that the routers/devices are synchronized during the MBFD session.

Figure 7:
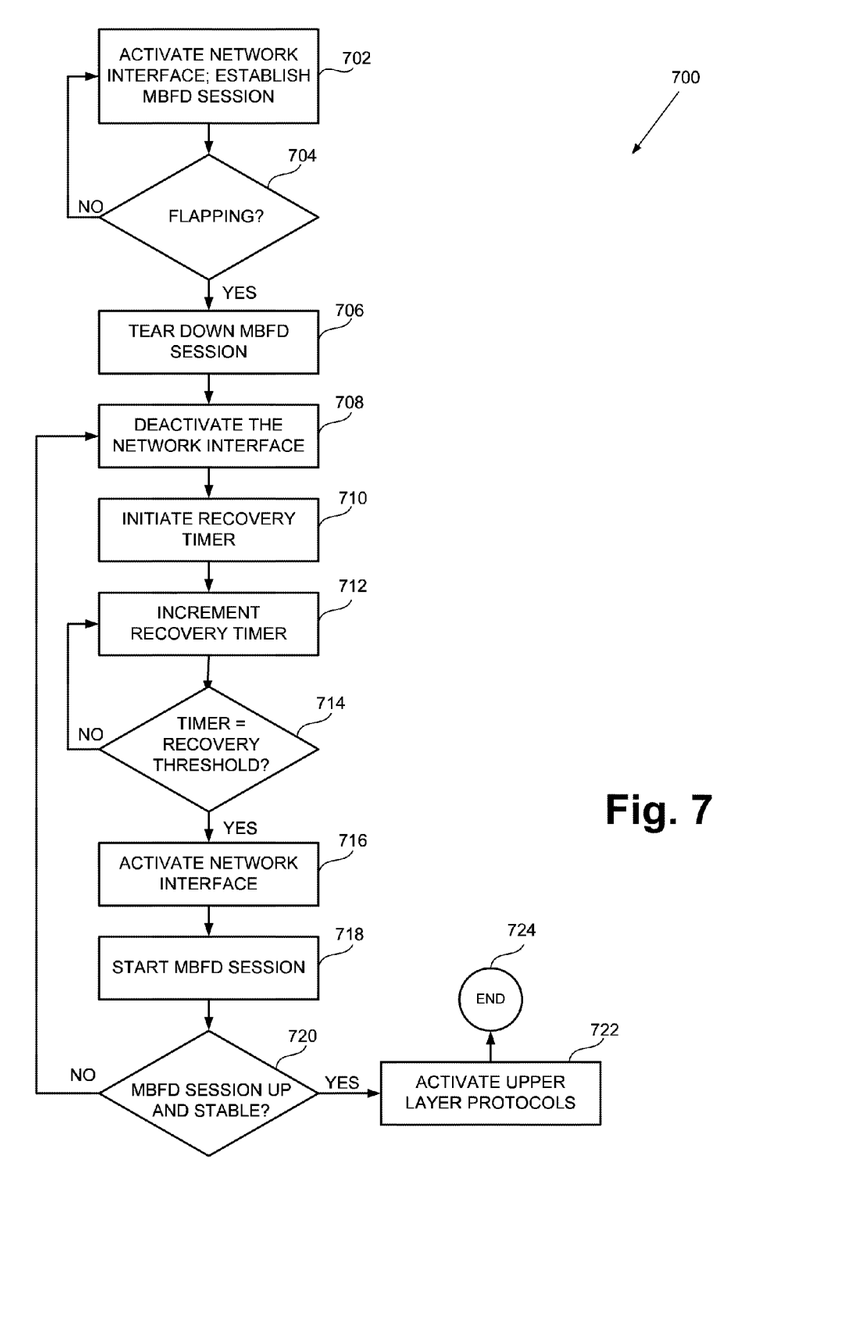
FIG. 7 is a flow diagram of an exemplary process that is associated with dampening interface flapping.

FIG. 7 is a flow diagram of an exemplary process 700 associated with dampening a flapping network interface. Although different types of network devices may perform process 700, for the following, assume that CE router 210-3 and PE router 214-1 are beginning to establish a communication session over ATM network 208-3. Also assume that network interface flapping at PE router 214-1 may affect the stability of private IP network 204. That is, for example, the interface flapping at PE router 214-1 may cause route flapping in private IP network 204.

At block 702, PE router 214-1 may enable a network interface and establish a MBFD session with CE router 210-3 over the network interface (block 702). For example, MBFD logic 516 may establish a MBFD session over a layer 2 logical network interface. In establishing the MBFD session, PE router 214-1 and CE router 210-3 may exchange MBFD control packets 600/630.

MBFD logic 516 in PE router 214-1 may determine whether the network interface is flapping (block 704). MBFD logic 516 may determine whether the network interface is flapping based on one or more criteria, such as whether router 214-1 receives MBFD packets 600/630 at particular times, whether there is any significant delays that are associated with received MBFD packets 600/630, etc. For example, if the network interface on PE router 214-1 sends ten MBFD control packets to CE router 210-3 and receives, in response, to only four MBFD control packets, MBFD logic 516 may determine that the network interface is flapping.

If the network interface is not flapping (block 704—NO), process 700 may return to block 702, to continue to run MBFD session via the network interface. Otherwise (block 704—YES), MBFD logic 516 may shut down or disable the MBFD session at PE router 214-1 (block 706). That is, MBFD logic 516 may change the state of the MBFD session to "down."

In addition, MBFD logic 516 may disable the network interface (block 708). For example, in FIG. 2, MBFD logic 516 in line card 304-x at PE router 214-1 may disable a layer 2 ATM network interface.

MBFD logic 516 may initiate a recovery timer (block 710) and increment the timer (block 712). If the time equivalent to a dampening recovery threshold (e.g., received via MBFD control packet 600/630 or obtained by measuring time between consecutive failures of the network interface) has not elapsed (block 714—NO), MBFD logic 516 may continue to increment the timer (block 712).

If the time equivalent to the recovery threshold has elapsed, MBFD logic 516 may re-enable or re-activate the network interface (block 716), and initiate or re-start a MBFD session (block 718). Via the MBFD session, MBFD logic 516 may monitor the stability of the network interface and/or as the stability of the MBFD session. In one implementation, the stability of the MBFD session/network interface may be determined based the percentage of MBFD control packets 600/630 that are received. For example, router 214-1 may request router 210-3 to deliver 100 MBFD control packets 600 over a period of time approximately equal to the dampening recovery threshold. Furthermore, if 99 MBFD control packets 600 are received (e.g., 99%), the MBFD session may be deemed stable. In other instances, successful receipt of other percentages of MBFD control packets 600/630 may indicate a stable MBFD session.

If the MBFD session fails or is not stable (block 720—NO) after the network interface is brought up and MBFD logic 516 attempts to initiate the MBFD session, processing may return to block 708. Otherwise (block 720—YES), MBFD logic 516 may enable/activate upper layer protocols (block 722). For example, MBFD logic 516 may enable the OSPF protocol or BGP. This may require MBFD logic 516 on line card 304-x to signal control module 302 to enable the appropriate routing protocols.

In the above, a network device (e.g., router 214-1) may detect interface flapping and provide for dampening the flapping via the MBFD protocol. To detect the interface flapping, the network device may establish a MBFD session with a remote device, and exchange MBFD control packets 600/630. Based on received MBFD control packets 600/630, the network device may determine whether its network interface is flapping. If so, the network device may disable/deactivate the network interface, the MBFD session, and other protocols. Thereafter, the network device may wait for a period of time sufficient to dampen the flapping, and enable the network interface, the MBFD session, and the protocols.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Furthermore, while a series of blocks have been described with regard to different processes, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a control module, configured to:
      run a routing protocol to obtain routing information from network devices;
   a line card, including:
      a processor, configured to:
         establish a bidirectional forwarding detection (BFD) session with a remote device;
         determine whether an interface associated with the BFD session is flapping, wherein the interface is a network layer 2 interface;
         terminate the BFD session in response to determining that the interface is flapping;
         disable the interface when the interface is determined to be flapping and after terminating the BFD session;
         re-enable the interface after a dampening recovery period elapses after disabling the interface;
         reestablish the BFD session in response to re-enabling the interface; and
         send a BFD packet to the remote device after reestablishing the BFD session.

2. The device of claim 1, wherein the processor is further configured to:
   disable the routing protocol at the control module when the interface is determined to be flapping; and
   re-enable the routing protocol at the control module after disabling the routing protocol and after the BFD session is reestablished.

3. The device of claim 2, wherein the routing protocol includes at least one of:
   open shortest path first (OSPF) protocol; or
   border gateway protocol (BGP).

4. The device of claim 2, wherein when the processor establishes the BFD, the processor is further configured to:
   send a BFD control packet to the remote device.

5. The device of claim 4, wherein the BFD control packet includes a dampening bit that indicates, to the remote device, that the interface is flapping.

6. The device of claim 4, wherein the BFD control packet includes:
   a field for conveying a value for the dampening recovery period to the remote device.

7. The device of claim 1, wherein the processor is further configured to:
   negotiate the dampening recovery period with the remote device.

8. The device of claim 1, wherein device comprises:
   a provider edge (PE) multiprotocol label switching (MPLS) router.

9. The device of claim 1, wherein after reestablishing the BFD session, the processor is further configured to:
   determine whether the BFD session is stable; and
   terminate the BFD session in response to determining that the BFD session is not stable.

10. The device of claim 1, wherein when the processor determines whether the interface associated with the BFD session is flapping, the processor is further configured to:

determine whether the device receives BFD control packets from the remote device.

11. A method comprising:
running a routing protocol for obtaining routing information from network devices;
establishing, with a remote device, a bidirectional forwarding detection (BFD) session over a network interface, wherein the network interface is a network layer 2 interface;
determining whether the network interface is flapping after the BFD session is established;
terminating the BFD session in response to determining that the network interface is flapping;
disabling the network interface when the network interface is determined to be flapping and after terminating the BFD session;
enabling the network interface after a dampening recovery threshold elapses after disabling the network interface;
reestablishing the BFD session in response to enabling the network interface; and
sending a BFD packet to the remote device after reestablishing the BFD session.

12. The method of claim 11, further comprising;
disabling the routing protocol in response to determining that the network interface is flapping; and
re-enabling the routing protocol after disabling the routing protocol and when the network interface is no longer flapping.

13. The method of claim 11, further comprising;
negotiating the dampening recovery threshold with the remote device.

14. The method of claim 13, wherein negotiating the dampening recovery threshold includes:
sending a BFD control packet with a value for the dampening recovery threshold to the remote device.

15. The method of claim 11, wherein determining whether the network interface is flapping includes:
analyzing BFD control packets received at the network interface.

16. The method of claim 11, reestablishing the BFD session includes:
initiating the BFD session;
determining whether the BFD session is stable; and
enabling the routing protocol in response to determining that the BFD session is stable.

17. The method of claim 16, further comprising:
terminating the BFD session in response to determining that the BFD session is unstable.

18. The method of claim 11, wherein reestablishing the BFD session includes:
sending a BFD control packet to the remote device, wherein the BFD control packet includes a dampening bit that indicates, to the remote device, that the network interface is flapping.

19. A tangible computer-readable medium comprising computer-executable instructions for causing one or more processors to:
establish, with a remote device, a bidirectional forwarding detection (BFD) session over a network interface, wherein the network interface is a network layer 2 interface;
determine whether the network interface is alternately failing and recovering after the BFD session is established;
disable upper layer protocols in response to determining that the network interface is alternately failing and recovering, wherein the upper layer protocols include protocols running above communication layer 2;
terminate the BFD session when the network interface is alternately failing and recovering and after disabling the upper layer protocols;
disable the network interface when the network interface is alternately failing and recovering and after terminating the BFD session;
re-enable the network interface after a dampening recovery threshold elapses after disabling the network interface; and
reestablish the BFD session in response to re-enabling the network interface.

\* \* \* \* \*